(12) United States Patent
Davda

(10) Patent No.: US 7,695,190 B2
(45) Date of Patent: Apr. 13, 2010

(54) THERMOCOUPLE RAKE TRUSS

(75) Inventor: M. Bansi Davda, Greenville, SC (US)

(73) Assignee: General Electric Company, Schenectady, NY (US)

(*) Notice: Subject to any disclaimer, the term of this patent is extended or adjusted under 35 U.S.C. 154(b) by 114 days.

(21) Appl. No.: 11/938,985

(22) Filed: Nov. 13, 2007

(65) Prior Publication Data
US 2009/0122833 A1    May 14, 2009

(51) Int. Cl.
    *G01K 7/00*    (2006.01)
    *G01K 1/00*    (2006.01)
    *G01K 3/00*    (2006.01)

(52) U.S. Cl. .................. 374/179; 374/208; 374/110; 374/166; 136/230

(58) Field of Classification Search ............ 374/110, 374/113, 116, 166, 179, 112, 115, 137, 144, 374/148
See application file for complete search history.

(56) References Cited

U.S. PATENT DOCUMENTS

| | | | | |
|---|---|---|---|---|
| 2,756,596 A | * | 7/1956 | Nelson et al. ............. | 374/144 |
| 2,820,839 A | * | 1/1958 | Schunke ................. | 136/231 |
| 3,165,426 A | * | 1/1965 | Paul .................... | 136/224 |
| 3,263,502 A | * | 8/1966 | Springfield ............. | 136/221 |
| 4,376,227 A | * | 3/1983 | Hilborn ................. | 136/242 |
| 5,433,114 A | | 7/1995 | Cook et al. | |
| 5,740,197 A | * | 4/1998 | Taggart et al. ........... | 374/148 |
| 5,775,807 A | * | 7/1998 | Dutcher ................. | 374/143 |
| 5,812,588 A | * | 9/1998 | Deak et al. .............. | 374/166 |
| 6,127,915 A | * | 10/2000 | Gam et al. .............. | 338/28 |
| 6,776,524 B2 | | 8/2004 | Park et al. | |
| 2002/0122459 A1 | | 9/2002 | McFarland et al. | |
| 2002/0182119 A1 | * | 12/2002 | Daily et al. ............. | 422/119 |
| 2004/0114665 A1 | | 6/2004 | Park et al. | |

* cited by examiner

*Primary Examiner*—Gail Verbitsky
*Assistant Examiner*—Mirellys Jagan
(74) *Attorney, Agent, or Firm*—Sutherland Asbill & Brennan LLP

(57) ABSTRACT

A thermocouple rake. The thermocouple rake may include a number of support rods extending through a number of support disks, a number of thermocouple tubes extending through the support disks, and with the thermocouple tubes and the support disks having a thermal compression bond when heated.

18 Claims, 2 Drawing Sheets

THERMOCOUPLE RAKE TRUSS

TECHNICAL FIELD

The present application relates generally to high temperature probe assemblies and more specifically relates to a thermocouple rake truss for temperature measurement in high temperature environments in gas turbines and similar types of devices.

BACKGROUND OF THE INVENTION

Thermocouple rake assemblies provide temperature measurement in high temperature and/or high airflow environments such as in gas turbine engines. The thermocouple rake assemblies generally have a number of thermocouples arranged therein at varying distances. Generally described, each thermocouple may include two dissimilar metals that are joined at one end. The metals generally produce a small given voltage at a given temperature. The voltage can be used by a thermocouple thermometer to provide temperature information on the turbine airflow path.

Although the thermocouple rake assemblies can withstand the high temperature environments of a gas turbine, the gas turbine also may generate high levels of vibrations. The vibration levels in the gas turbine, however, may be highly variable. The thermocouple rake assembly therefore must be able to withstand vibration in all directions and at all frequencies. The combination of excess heat and/or vibration thus may cause thermocouple rake failure.

There is a desire therefore for an improved thermocouple rake assembly that can withstand increased temperatures and vibrations without failure. Specifically, the rake assembly should be able to withstand vibrations from any direction and at any frequency.

SUMMARY OF THE INVENTION

The present application thus describes a thermocouple rake. The thermocouple rake may include a number of support rods extending through a number of support disks, a number of thermocouple tubes extending through the support disks, and with the thermocouple tubes and the support disks having a thermal compression bond when heated.

The application further describes a thermocouple rake with a number of thermocouples. The thermocouple rake may include a support rod extending through a number of support disks, a number of thermocouple tubes for the thermocouples extending through the support disks, and with the thermocouple tubes and the support disks having a thermal compression bond when heated.

These and other features of the present application will become apparent to one of ordinary skill in the art upon review of the following detailed description when taken in conjunction with the several drawings and the appended claims.

DETAILED DESCRIPTION

Figure 1:
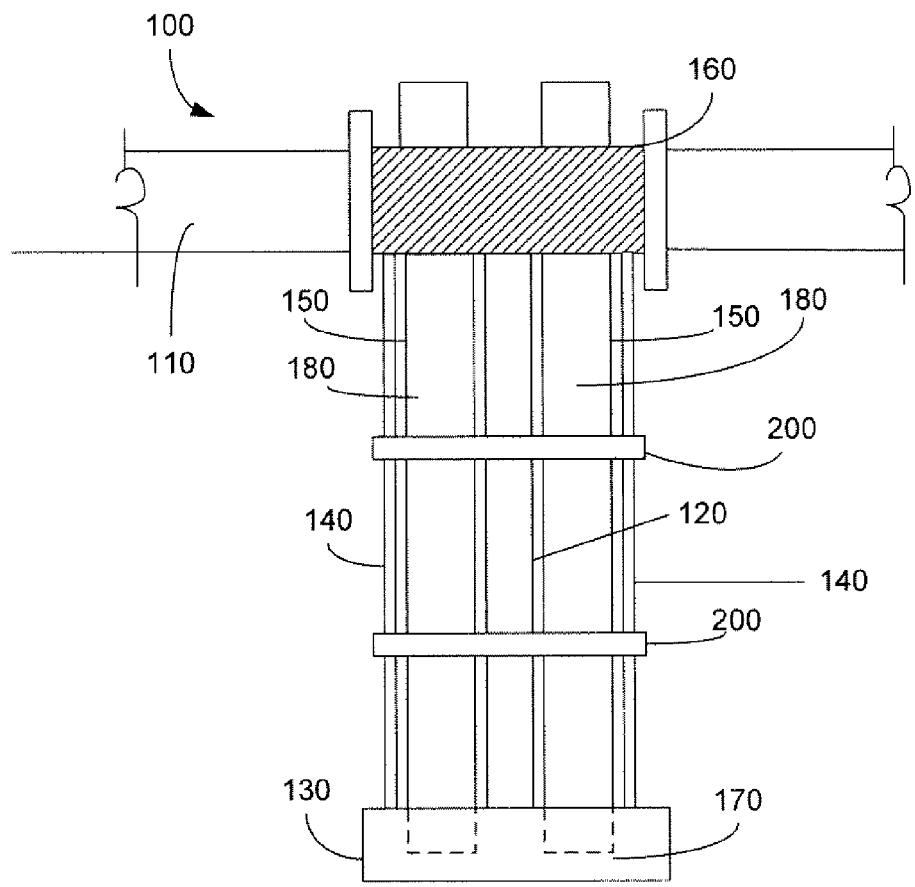
FIG. 1 is a plan view of the thermocouple rake assembly as is described herein.
Figure 2:
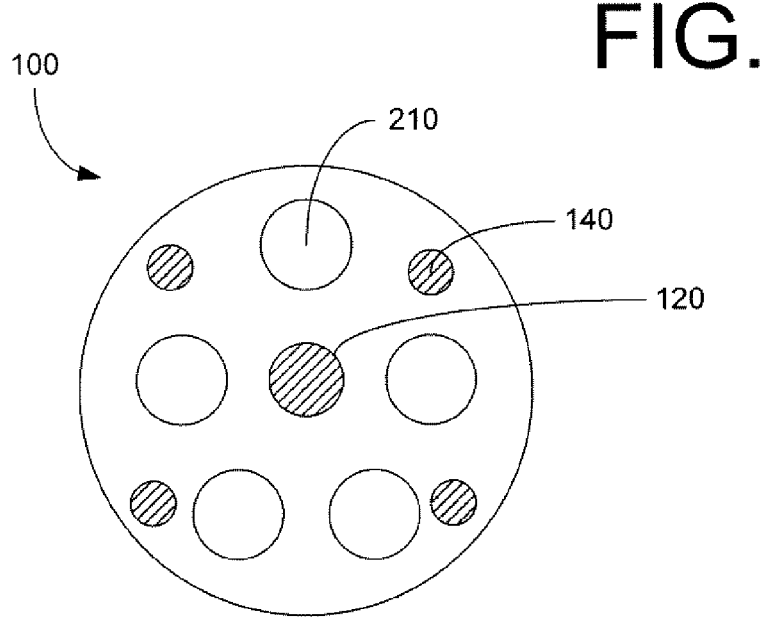
FIG. 2 is a side cross-sectional view of the thermocouple rake assembly of FIG. 1.

Referring now to the drawings, in which like numerals refer to like elements throughout the several views, FIGS. 1 and 2 show a thermocouple rake assembly 100 as is described herein. The rake assembly 100 will extend through an outer casing 110. The outer casing 110 may be the surface of a gas turbine or similar types of structures. A number of apertures may extend through the outer casing 110 as will be described in more detail below.

The thermocouple rake assembly 100 may have a center rod 120. The center rod 120 may be solid or hollow. The geometry of the center rod 120 may vary with the natural frequency and the structural integrity of the thermocouple rake assembly 100 as a whole. The center rod 120 may vary in length, slope, or other characteristics. The center rod 120 may extend from the outer casing 110 to an end disk 130. The center rod 120 may have any desired length. The center rod 120 may be made out of nickel-based alloys, stainless steel, or similar types of substantially temperature resistant materials.

The rake assembly 100 also may have a number of outer support rods 140. Specifically, three (3), four (4), five (5), or other number of outer support rods 140 may be used. The support rods 140 may be hollow or solid. The geometry of the outer support rods 140 also may vary with the natural frequency and the structural integrity of the thermocouple rake assembly 100 as a whole. The support rods 140 may vary in length, slope, or other characteristics. The outer support rods 140 also may extend from the casing 120 to the end disk 130. The center rod 120 and the outer support rods 140 may be welded or brazed to the end disk 130. Other types of connection means also may be used herein. The outer support rods 140 may be made out of nickel-based alloys, stainless steel, or similar types of substantially temperature resistant materials.

The rake assembly 100 also may have a number of thermocouple tubes 150. The thermocouple tubes 150 may extend through a number of casing apertures 160 positioned in the outer casing 110 on one end and may extend to a number of cups 170 in the end disk 130 on the other. Apertures also may be used in the end disk 130 instead of the cups 160. The thermocouple tubes 150 may have any desired length. The thermocouple tubes 150 may be made out of nickel-based alloys, stainless steel, or similar types of substantially temperature resistant materials.

A thermocouple 180 may be positioned within each of the thermocouple tubes 150. The thermocouple 180 may be of conventional design. The thermocouples 180 may be molded or cast into the thermocouple tubes 150 as a single assembly such that the vibration of the thermocouples 180 within the tubes 150 is reduced or eliminated. The tubes 150 will be secured to the outer casing 110 by a Swagelok type compression fitting 190. Similar types of compression fittings or other types of joinder means may be used herein.

The thermocouple rake assembly 100 may have a number of disks 200 positioned between the outer casing 110 and the end disk 130. The disks 200 may have a number of disk apertures 210 positioned therein. The disk apertures 210 permit the thermocouple tubes 150 to pass therethrough. The disk apertures 210 will be sized for a tight geometric fit so as to allow the thermocouple tubes 150 to slide therethrough. The disk 210 to tube 150 thermal-coefficient should be such that as the rake assemble 100 is heated to the exhaust gas temperature (approximately 1200° F. (649° C.)), the disks 200 and the tubes 150 will grow thermally such that the disks 200 will compress about the tubes 150 and form a thermal bond in a manner similar to a web weld. The disks 200 may be made out of nickel-based alloys, stainless steel, or similar types of substantially temperature resistant materials. Sliding friction therefore is generally reduced or eliminated when the rake assembly 100 is at the gas turbine running temperature.

The combination and geometry of the center rod 120 and the outer support rods 140 with the disks 200 provide a natural frequency and support properties of the rake assembly 100 as a whole. The natural frequency of the rake assembly 100 as a whole can modified as desired. For example, the support rods 140 and the disks 200 may be arranged to tune the frequency outside of a specific range or a series of ranges. The center rod 120, the support rods 140, and the disks 200 may be welded or brazed together.

Figure 3:
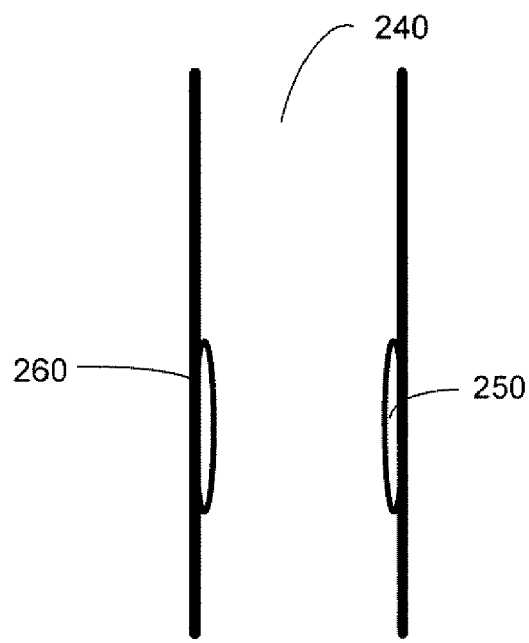
FIG. 3 is plan view of a lead thermocouple tube for use in the thermocouple rake assembly of FIG. 1.
Figure 4:
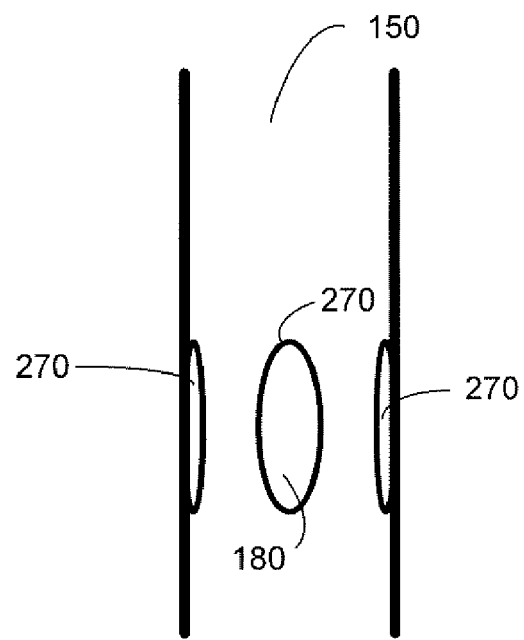
FIG. 4 is a plan view of a following thermocouple tube for use in the thermocouple rake assembly of FIG. 1.

A lead thermocouple may be the only thermocouple essential for thermal response. A lead thermocouple tube 240 therefore should be located forward of the other tubes 150. As is shown in FIG. 3, the lead thermocouple tube 240 should have a forward hole 250 and an aft hole 260 similar in size to the EGT ("Exhaust Gas Thermocouple") radiation shield so as to match airflow response time. As is shown in FIG. 4, the other tubes 150 may have four (4) holes 270 or more at about a ninety degree spacing rather than the forward hole 250 and the aft hole 260. The four holes 270 will allow air from various angles strike the tubes 150 without concern for response time but with capacity for adequate sampling of external air.

In use, the thermocouples 180 and the associated tubes 150 are positioned within the outer casing 110, the disks 200, and the end disk 180. The thermocouples 180 may have varying lengths. The tubes 150 have holes 250, 260, 270 positioned therein at the appropriate length so as to sample the external air. Vibrations in the thermocouple rake assembly 100 as a whole are reduced via thermal expansion of the disk 200 and the tubes 150. The thermocouple rake assembly 100 therefore can provide accurate temperature measurement in the airflow path despite the expected vibrations of the turbine.

It should be apparent that the foregoing relates only to the preferred embodiments of the present application and that numerous changes and modifications may be made herein by one of ordinary skill in the art without departing from the general spirit and scope of the invention as defined by the following claims and the equivalents thereof.

I claim:

1. A thermocouple rake, comprising:
a plurality of support rods;
the plurality of support rods extending through a plurality of support disks; and
a plurality of thermocouple tubes extending through the plurality of support disks;
the plurality of thermocouple tubes and the plurality of support disks comprising a thermal compression bond therebetween when heated.

2. The thermocouple rake of claim 1, wherein the plurality of support rods comprises a plurality of outer support rods.

3. The thermocouple rake of claim 1, further comprising a thermocouple positioned within each of the plurality of thermocouple tubes.

4. The thermocouple rake of claim 1, wherein the plurality of thermocouple tubes comprises a plurality of lengths.

5. The thermocouple rake of claim 1, wherein the plurality of thermocouple tubes comprises a plurality of apertures therein.

6. The thermocouple rake of claim 1, wherein the plurality of thermocouple tubes comprises a lead thermocouple tube.

7. The thermocouple rake of claim 6, wherein the lead thermocouple tube comprises a forward aperture and an aft aperture therein.

8. The thermocouple rake of claim 1, wherein the plurality of support rods comprises a center rod.

9. The thermocouple rake of claim 8, wherein the center rod comprises a solid rod.

10. The thermocouple rake of claim 8, wherein the center rod comprises a hollow rod.

11. A thermocouple rake with a number of thermocouples, comprising:
a support rod;
the support rod extending through a plurality of support disks;
a plurality of thermocouple tubes for the number of thermocouples;
the plurality of thermocouple tubes extending through the plurality of support disks; and
the plurality of thermocouple tubes and the plurality of support disks comprising a thermal compression bond therebetween when heated.

12. The thermocouple rake of claim 11, wherein the support rod comprises a solid rod.

13. The thermocouple rake of claim 11, wherein the support rod comprises a hollow rod.

14. The thermocouple rake of claim 11, further comprising a plurality of outer support rods.

15. The thermocouple rake of claim 11, wherein the plurality of thermocouple tubes comprises a plurality of lengths.

16. The thermocouple rake of claim 11, wherein the plurality of thermocouple tubes comprises a plurality of apertures therein.

17. The thermocouple rake of claim 11, wherein the plurality of thermocouple tubes comprises a lead thermocouple tube.

18. The thermocouple rake of claim 17, wherein the lead thermocouple tube comprises a forward aperture and an aft aperture therein.

* * * * *